United States Patent (10) Patent No.: US 9,440,530 B2
Yoshida et al. (45) Date of Patent: Sep. 13, 2016

(54) VEHICLE BODY STRUCTURE

(71) Applicant: Honda Motor Co., Ltd., Tokyo (JP)

(72) Inventors: Masayasu Yoshida, Wako (JP);
Daisuke Nohara, Wako (JP);
Youichirou Hamano, Wako (JP); Keita Ishihara, Wako (JP); Takashi Kikuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/402,421

(22) PCT Filed: Mar. 22, 2013

(86) PCT No.: PCT/JP2013/058256
§ 371 (c)(1),
(2) Date: Nov. 20, 2014

(87) PCT Pub. No.: WO2013/183337
PCT Pub. Date: Dec. 12, 2013

(65) Prior Publication Data
US 2015/0090518 A1 Apr. 2, 2015

(30) Foreign Application Priority Data
Jun. 4, 2012 (JP) ................................ 2012-127394

(51) Int. Cl.
*B60K 13/04* (2006.01)
*B60K 15/063* (2006.01)
*B62D 25/02* (2006.01)
(52) U.S. Cl.
CPC ............. *B60K 15/063* (2013.01); *B60K 13/04* (2013.01); *B62D 25/025* (2013.01); *B60K 2015/0634* (2013.01); *B60Y 2306/01* (2013.01)

(58) Field of Classification Search
CPC ............... B60K 13/04; B60K 15/063; B60K 2015/0634; B60K 15/067; B60K 2015/0675
See application file for complete search history.

(56) References Cited

U.S. PATENT DOCUMENTS 7,331,611 B2 * 2/2008 Kusu ..................... B60K 13/04
180/309
7,364,002 B2 * 4/2008 Mabuchi ................ B62D 21/02
180/291

(Continued)

FOREIGN PATENT DOCUMENTS

JP 04-215523 8/1992
JP 05-213075 8/1993

(Continued)

OTHER PUBLICATIONS

Chinese Office Action dated Nov. 27, 2015, 2 pages.

*Primary Examiner* — Katy M Ebner
(74) *Attorney, Agent, or Firm* — Rankin, Hill & Clark LLP

(57) ABSTRACT

A vehicle body structure (10) is provided with: an exhaust pipe (18) disposed between a fuel container (16) and a right framework member (12) so as to extend in the front-rear direction of the vehicle body; and a slide member (23) provided to the framework side wall (25) of the right framework member (12). The slide member (12) is provided to the portion (27) of the framework side wall (25), which is overlapped by the fuel container (16) and a chamber (42) in the width direction of the vehicle. The slide member (23) has a slide slope section (64). The slide slope section (64) is tilted inward in the width direction of the vehicle from the lower end (64b) toward the upper end (64a) so as to approach the fuel tank (16).

7 Claims, 12 Drawing Sheets

(56) References Cited

U.S. PATENT DOCUMENTS

| | | | |
|---|---|---|---|
| 7,658,440 B2* | 2/2010 | Tohda | B60K 13/04 296/204 |
| 7,758,075 B2* | 7/2010 | Isayama | B60K 15/063 280/124.109 |
| 8,151,922 B2* | 4/2012 | Suzuki | B60K 13/04 180/89.2 |
| 2009/0288912 A1* | 11/2009 | Yamaguchi | B60K 13/04 181/227 |

FOREIGN PATENT DOCUMENTS

| JP | 10-266825 | | 10/1998 |
|---|---|---|---|
| JP | 2004-025980 | | 1/2004 |
| JP | 2006-089038 | | 4/2006 |
| JP | 2008-037198 | | 2/2008 |
| JP | 2008037198 A | * | 2/2008 |
| JP | 2008-120342 | | 5/2008 |
| JP | 2008-150042 | | 7/2008 |
| JP | 2010-209816 | | 9/2010 |

* cited by examiner

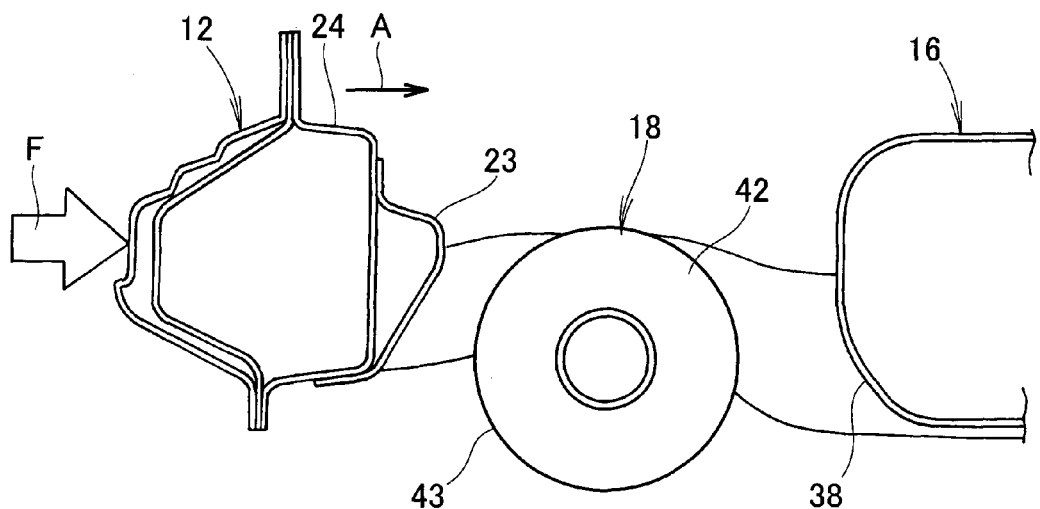
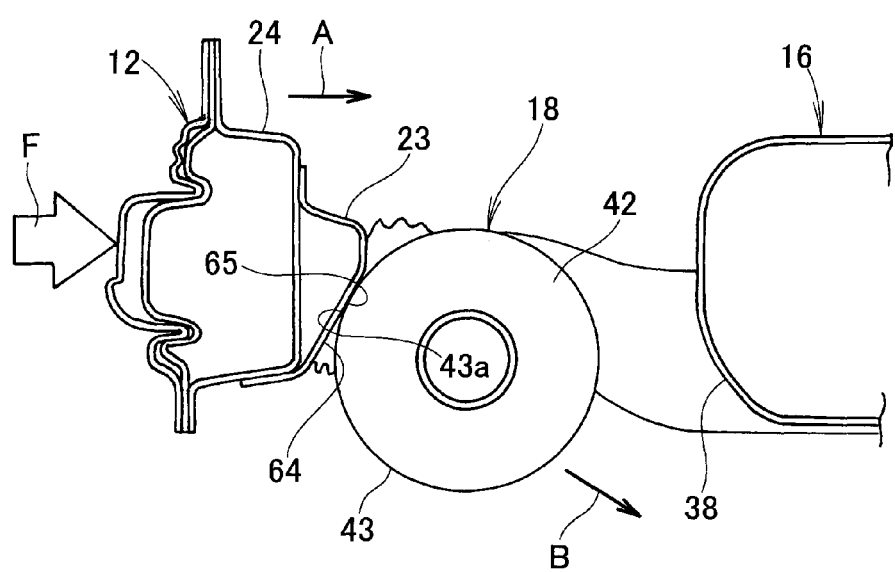
FIG.9

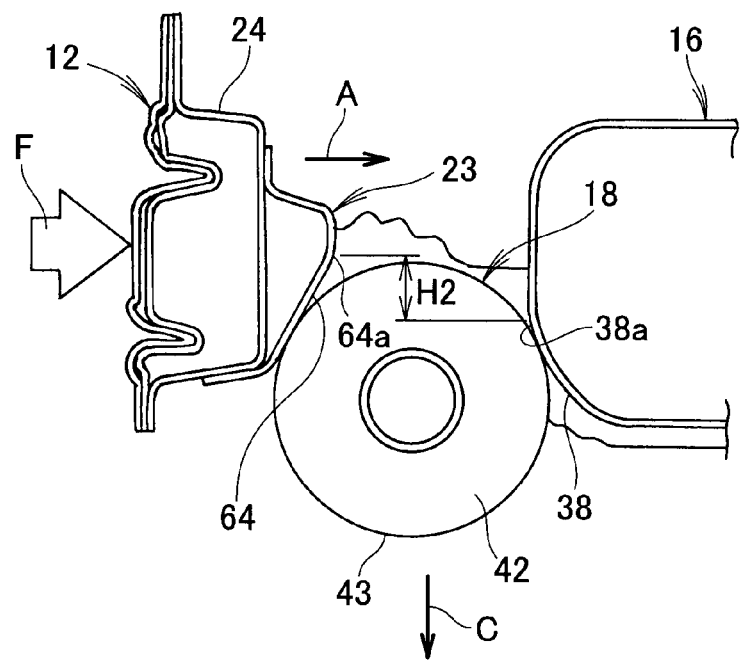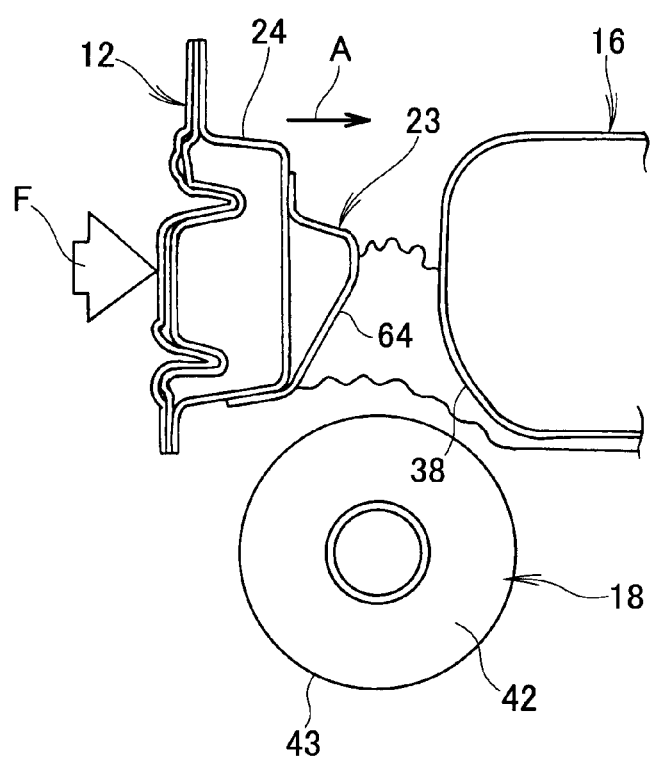
FIG.10

VEHICLE BODY STRUCTURE

TECHNICAL FIELD

The present invention relates to a vehicle body structure including left and right framework members provided on left and right sides of a vehicle body, an energy container provided between the left and right framework members, and an exhaust tube provided between the energy container and the framework member.

BACKGROUND ART

A known vehicle body structure includes energy containers individually provided on a side of a driver's seat and a side of a passenger's seat below a floor panel. As for this vehicle body structure, it is necessary to provide a communicating pipe through which the driver's seat side fuel container communicates with the passenger's seat side fuel container as well as to provide individual pumps for delivering fuel from the respective fuel containers.

In order to eliminate the communicating and reduce the number of the fuel-delivering pumps, an integral fuel container extending from the driver's side to the passenger's side has been proposed (see e.g., Patent Literature 1 below). Since the integral fuel container is a single-piece container, the number of the components is reduced and thus a space between the driver's seat side and the passenger's seat side below the floor panel is available for part of the fuel container. Since the part of the fuel container uses the space between the driver's seat side and the passenger's seat side, the fuel container can have a large capacity.

The vehicle body structure disclosed in Patent Literature 1 includes floor frames (reinforcement members) provided on left and right sides of the fuel container beneath the floor panel. The left and right floor frames extend in a front-rear direction of the vehicle body along left and right surfaces of the fuel container. The floor frames, which are provided on the left and right sides of the fuel container, can absorb an impact load due to a lateral collision and thus protect the fuel container.

As for the vehicle body structure disclosed in Patent Literature 1, an exhaust pipe is provided between the right floor frame and the fuel container. Because of the exhaust pipe, it is difficult to place a fuel container widening in a left-right direction (i.e., in a widthwise direction of the vehicle). That is, the exhaust pipe is an obstruction to increasing the capacity of the fuel container. It is thought that the floor frame is removed from the vehicle body structure in order to place the fuel container widening in the widthwise direction of the vehicle. However, even with the floor panel removed, an amount of crushing is limited because the exhaust pipe has a relatively high rigidity due to a plurality of pipes or partition walls being disposed in the exhaust pipe. It is thus difficult to well absorb the impact load, and necessary to secure a large amount of crushing on the side of the fuel container near the exhaust pipe, taking account of the exhaust pipe limiting the amount of crushing. It is thus thought that placing the fuel container (i.e., the energy container) widening toward the exhaust pipe to increase the capacity is difficult even with the floor frame removed from the vehicle body structure.

PRIOR ART LITERATURE

Patent Literature

Patent Literature 1: JP-A-2006-89038

SUMMARY OF INVENTION

Technical Problem

It is an object of the present invention to provide a vehicle body structure capable of well absorbing the impact load due to the lateral collision as well as of increasing the capacity of the energy container.

Solution to Problem

According to one aspect of the present invention, there is provided a vehicle body structure comprising: left and right framework members extending in a front-rear direction of a vehicle body on left and right sides of the vehicle body; an energy container provided between the left and right framework members; and an exhaust tube provided between the energy container and the framework member and extending in the front-rear direction of the vehicle body, wherein the exhaust tube includes an exhaust pipe and a chamber larger in outer diameter than the exhaust pipe, wherein the framework member includes a framework sidewall provided on a side of the energy container, the framework sidewall having an overlap region overlapping the energy container and the chamber in a widthwise direction of a vehicle, the framework member having a slider member provided on the overlap region of the framework sidewall, and wherein the slider member has a slider slanting portion having an upper end and a lower end, the slider slanting portion inclining in a widthwise inward direction of the vehicle such that the slider slanting portion approaches the energy container as the slider slanting portion extends from the lower end to the upper end.

It is preferable that the slider slanting portion have a contact region to abut on the chamber when an impact load is applied from a lateral side of the vehicle, and the contact region be located below the upper end of the slider slanting portion.

Preferably, the energy container has a container sidewall provided on a side of the framework member, the container sidewall having a container slanting portion having an upper end and a lower end, the container slanting portion inclining in a widthwise outward direction of the vehicle such that the container slanting portion approaches the framework member as the container slanting portion extends from the lower end to the upper end.

In a further aspect, the energy container has a container sidewall provided on a side of the framework member, the container sidewall having a container slanting portion having an upper end and a lower end, the container slanting portion inclining in a widthwise outward direction of the vehicle such that the container slanting portion approaches the framework member as the container slanting portion extends from the lower end to the upper end, and wherein the upper end of the container slanting portion is located below the upper end of the slider slanting portion.

In a still further aspect, the exhaust tube is supported by the vehicle body through an elastic member.

Advantageous Effects of the Invention

In the present invention, the framework member has the slider member on the framework sidewall on the side of the energy container, and the slider member is provided on the region overlapping the energy container and the chamber. The slider member has the slider slanting portion, and the slider slanting portion inclines such that the slider slanting portion approaches the energy container as the slider slanting portion extends from the lower end to the upper end.

When the framework member is deformed toward the energy container under the impact load from a lateral side of the vehicle, the slider slanting portion abuts on the chamber to thereby displace (move) the chamber downwardly. The downward displacement of the chamber allows removal of the chamber from between the framework member and the energy container. As a result, an amount of crushing due to the impact load is secured between the framework member and the energy container. Thus, it is possible to well absorb the impact load produced by the lateral collision.

Since the amount of crushing due to the impact load is secured by the downward displacement of the chamber, there is no likelihood that the amount of crushing due to the impact load is limited by the chamber. In other words, securing a large amount of crushing between the framework member and the energy container does not require taking account of the chamber limiting the amount of crushing. Thus, the energy container can be wide toward the chamber to provide a large capacity of the energy container.

In the invention, the slider slanting portion has the contact region to abut on the chamber when the impact load is applied. The contact region is located below the upper end of the slider slanting portion. This enables the abutment of the contact region of the slider slanting portion on the chamber to thereby displace the chamber downwardly, regardless of a cross-sectional shape of the chamber (without being affecting by the cross-sectional shape of the chamber). As a result, the chamber is removed from between the framework member and the energy container to thereby secure the amount of crushing due to the impact load. Thus, it is possible to well absorb the impact load produced by the lateral collision, and the energy container can be wide toward the chamber so as to provide a large capacity of the energy container.

In the invention, the container sidewall of the energy container has the container slanting portion inclining such that the container slanting portion approaches the framework member as the container slanting portion extends from the lower end to the upper end. Thus, the chamber abuts on the container slanting portion after the slider slanting portion abuts on the chamber. When the chamber abuts on the container slanting portion, both the slider slanting portion and the container slanting portion promote the downward displacement of the chamber. This enables quick removal of the chamber from between the framework member and the energy container, thereby reliably securing the amount of crushing due to the impact load. Thus, it is possible to well absorb the impact load produced by the lateral collision, and the energy container can be wide toward the chamber so as to provide a large capacity of the energy container.

In the invention, the upper end of the container slanting portion is located below the upper end of the slider slanting portion. That is, the container slanting portion is provided in correspondence to the chamber displaced downwardly by the slider slanting portion. This makes it possible to reliably bring the chamber, displaced downwardly by the slider slanting portion, into abutment on the container slanting portion so as to better promote the downward displacement of the chamber.

The promotion of the downward displacement of the chamber enables quick removal of the chamber from between the framework member and the energy container, thereby reliably securing the amount of crushing due to the impact load. Thus, it is possible to well absorb the impact load produced by the lateral collision, and the energy container can be wide toward the chamber so as to provide a large capacity of the energy container.

In the invention, the exhaust tube is supported by the vehicle body through the elastic member. Thus, deformation (stretching) or breakage of the elastic member allows the chamber to be smoothly displaced downwardly. This enables quick removal of the chamber from between the framework member and the energy container, thereby reliably securing the amount of crushing due to the impact load. Thus, it is possible to well absorb the impact load produced by the lateral collision, and the energy container can be wide toward the chamber so as to provide a large capacity of the energy container.

BRIEF DESCRIPTION OF DRAWINGS

FIG. 9 is a view illustrating an example in which the slider in embodiment 1 displaces a chamber downwardly;

FIG. 10 is a view illustrating an example of removal of the chamber from between a right framework member and a fuel container in embodiment 1;

DESCRIPTION OF EMBODIMENTS

Figure 1:
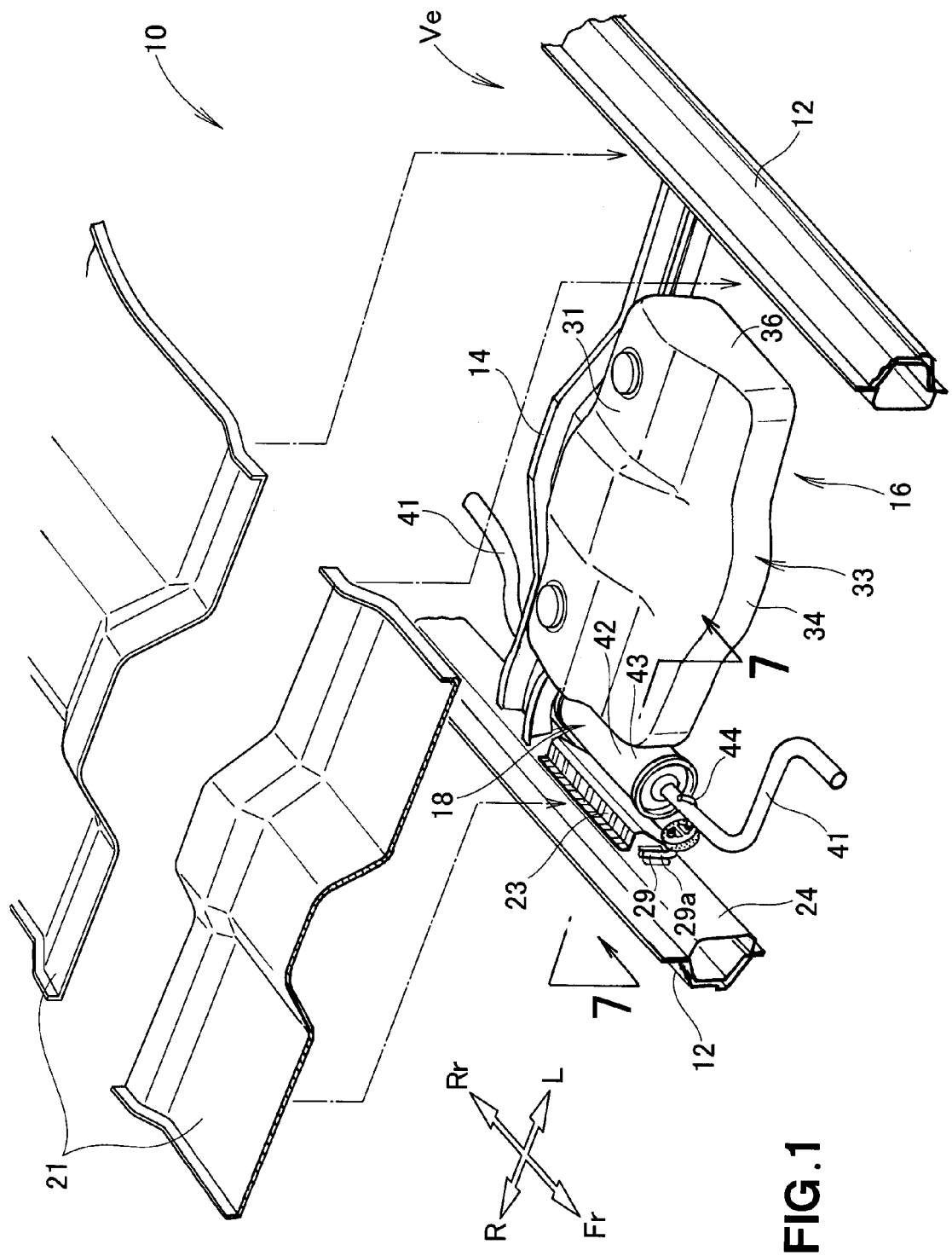
FIG. 1 is an exploded perspective view of a vehicle body structure in embodiment 1 of the present invention as the vehicle body structure is viewed from above.

Certain preferred embodiments of the present invention are described below with reference to the accompanying drawings.

Reference characters "Fr", "Rr", "L" and "R" denote a "forward" direction, a "rearward" direction, a "leftward" direction, and a "rightward" direction, respectively, as seen from a driver.

Embodiment 1

Figure 2:
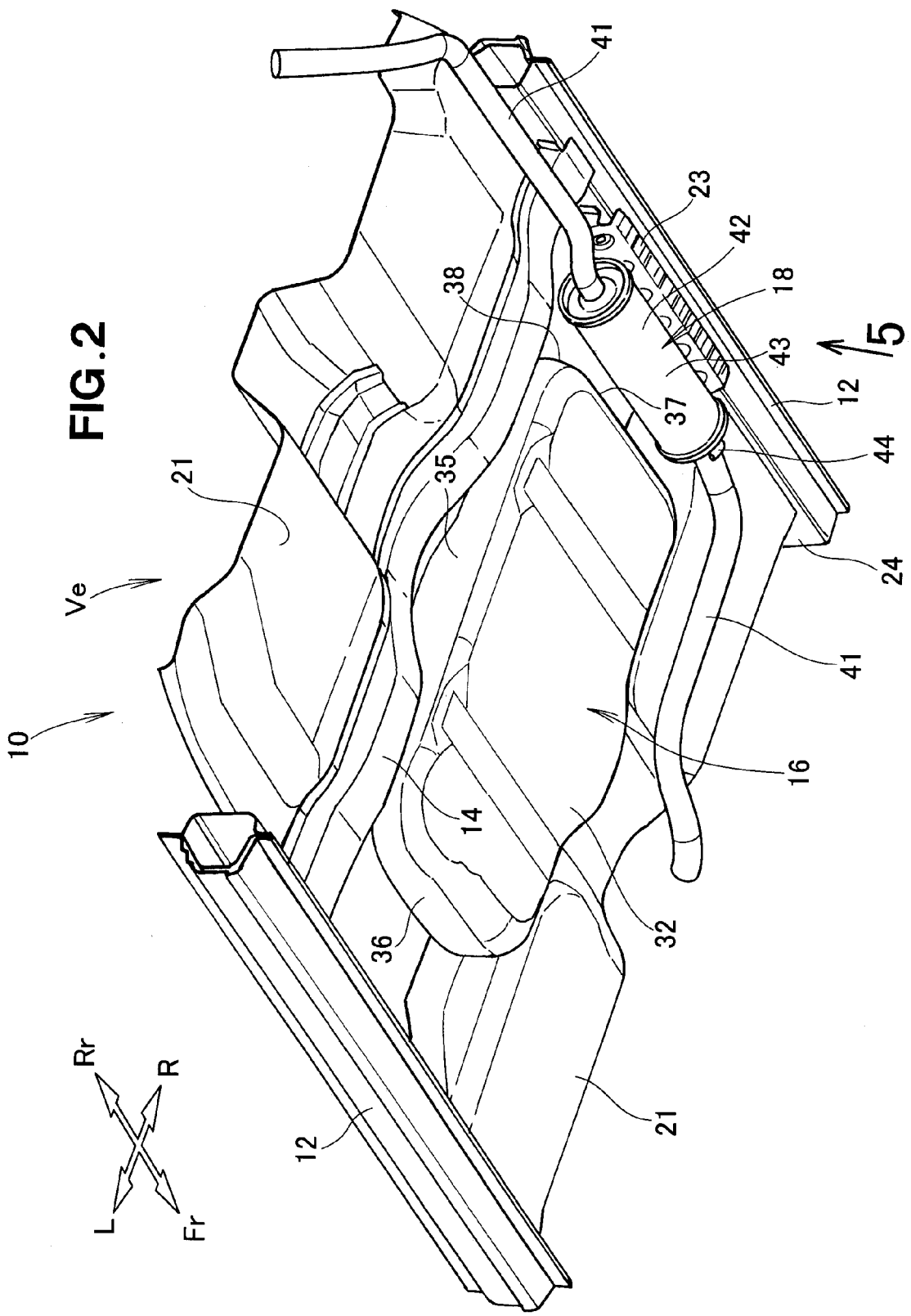
FIG. 2 is a perspective view of the vehicle body structure in embodiment 1 as the vehicle body structure is viewed from below.

As shown in FIGS. 1 and 2, a vehicle body structure 10 includes left and right framework members 12 provided on left and right sides of a vehicle body Ve, a cross member 14 extending between and interconnecting the left and right framework members 12, and a fuel container (an energy container) provided forwardly of the cross member 14. The vehicle body structure 10 further includes an exhaust tube 18 provided between the fuel container 16 and the right framework member 12, a floor panel 21 covering the fuel container 16 and the exhaust tube 18 from above, and a slider member 23 provided on the right framework member 12.

The left and right framework members 12 are so-called side sills provided on left and right sides of the vehicle body Ve with a predetermined interval therebetween and extending in a front-rear direction of the vehicle body. The slider member 23 is provided on an inner member 24 of the right framework member 12. On the inner member 24 of the right framework member 12, further, there is provided a base portion 29a of a vehicle body support rod 29 (see FIG. 4, too). The right framework member 12 and the vehicle body support rod 29 form part of the vehicle body Ve.

The cross member 14, which extends and interconnects the left and right framework members 12, extends in a widthwise direction of the vehicle. The cross member 14 is provided rearwardly of the fuel container 16 to protect a rear part of the fuel container 16.

The fuel container 16 is a hollow fuel tank which can hold liquid fuel therein, and is provided between the left framework member 12 and the right framework member 12 and forwardly of the cross member 14. The fuel container 16 has a generally rectangular top portion 31, a generally rectangular bottom portion 32, and a circumferential wall portion 33 extending along circumferential edges of the top and bottom portions 31, 32.

Figure 5:
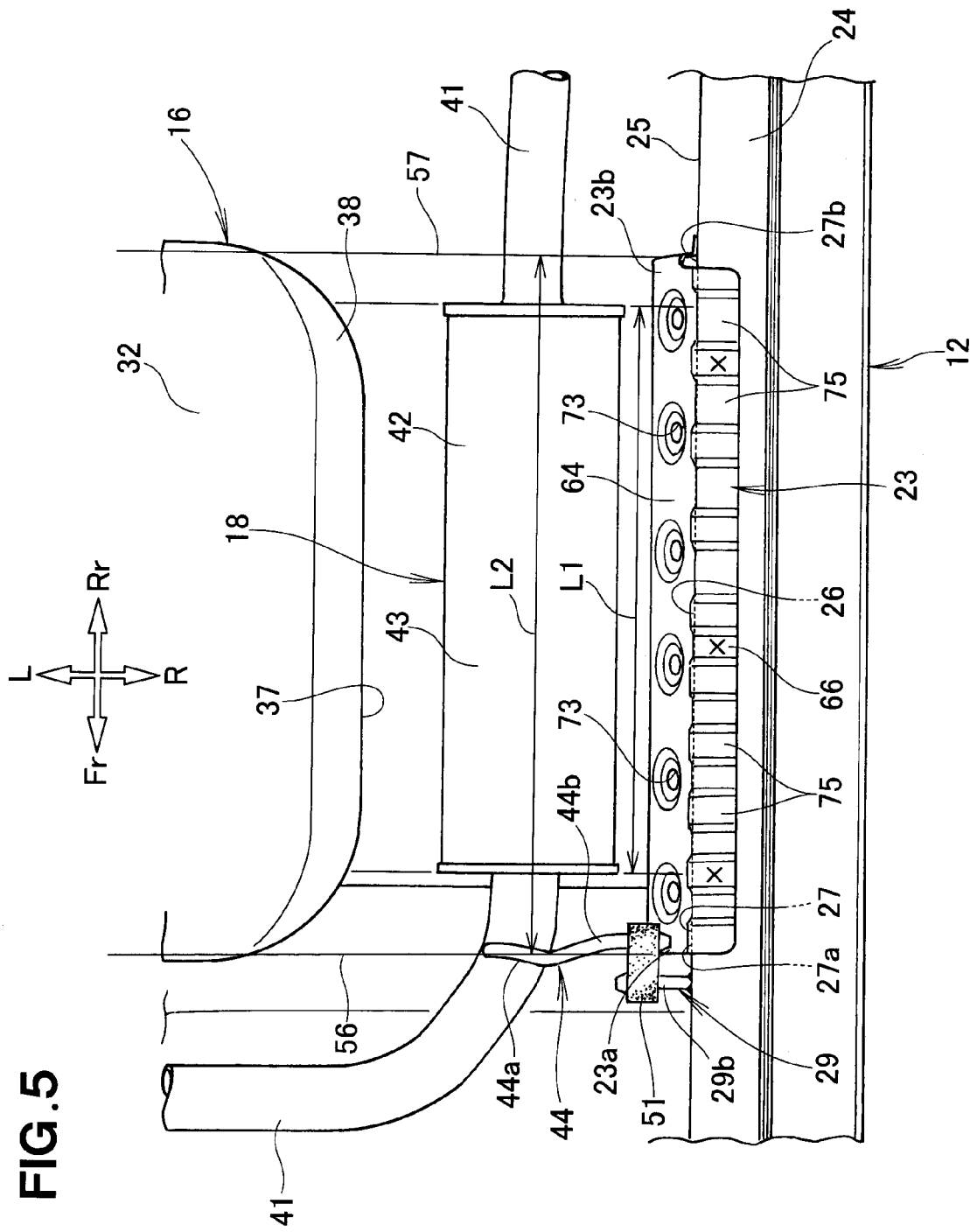
FIG. 5 is a view taken in a direction of arrow 5 shown in FIG. 2

The circumferential wall portion 33 includes a front wall 34, a rear wall 35, a left sidewall 36, and a right sidewall (container sidewall) 37 (see FIG. 5, too). The front wall 34 faces a front side of the vehicle body and extends in the widthwise direction of the vehicle. The rear wall 35 faces a rear side of the vehicle body and extends in the widthwise direction of the vehicle. The left sidewall 36 faces a widthwise left side of the vehicle and extends in the front-rear direction of the vehicle body. The right sidewall 37 faces a widthwise right side of the vehicle, extends in the front-rear direction of the vehicle body, and assumes a vertical position. The right sidewall 37 has a container slanting portion 38 (see FIG. 7, too) which will be discussed with reference to FIG. 7.

The exhaust tube 18 includes an exhaust pipe 41 communicating with an exhaust manifold of an engine, a chamber 42 as a silencer provided on the exhaust pipe 41, and an exhaust tube support rod 44 provided on the exhaust pipe 41. The chamber 42 includes an outer tubular portion 43 whose cross-sectional shape is a circle having an outer diameter D. The outer diameter D (FIG. 4) of the outer tubular portion 43 of the chamber 42 is larger than that of the exhaust pipe 41. The chamber 42 is provided between the fuel container 16 and the right framework member 12 and extends in the front-rear direction of the vehicle body.

Figure 3:
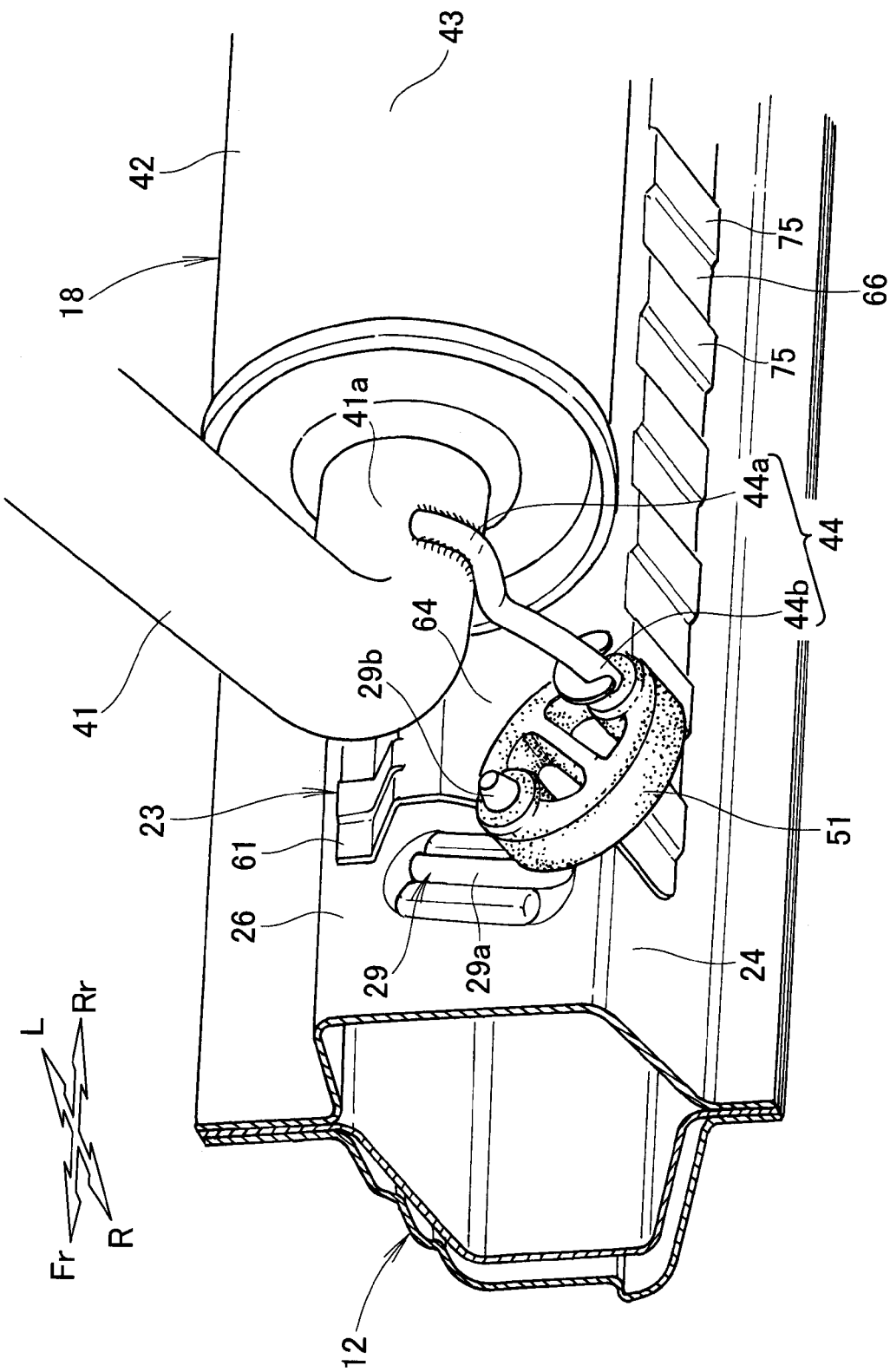
FIG. 3 is a perspective view showing that an exhaust tube in embodiment 1 is connected to a vehicle body side by means of a connecting member.
Figure 4:
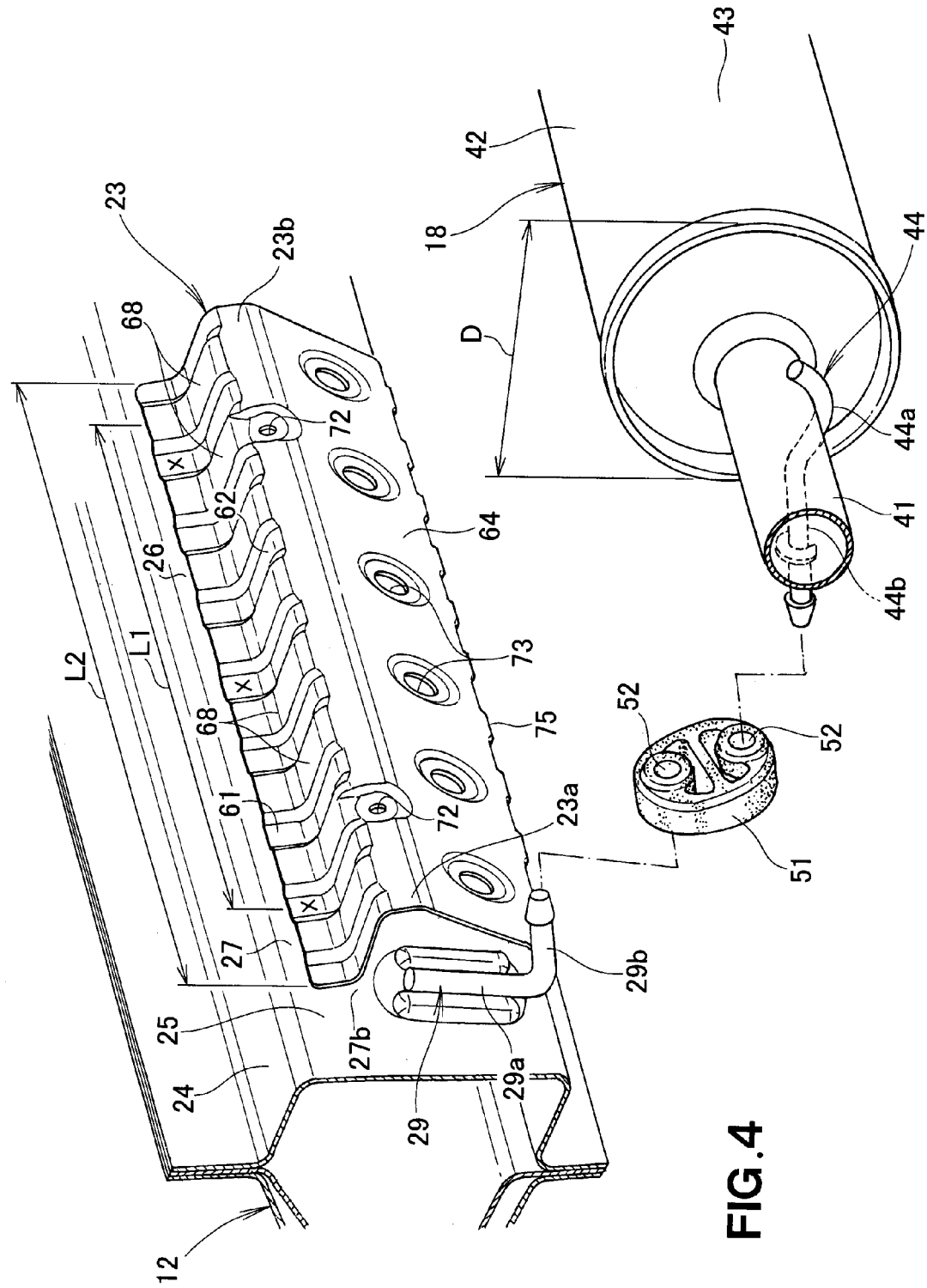
FIG. 4 is an exploded perspective view of a slider member and the exhaust tube in embodiment 1.

As shown in FIGS. 3 and 4, the exhaust tube support rod 44 has a base portion 44a provided on a region 41a of the exhaust pipe 41, which region is located forwardly of the chamber 42 in a forward direction of the vehicle body. The exhaust tube support rod 44 also has a rod portion 44b extending from the base portion 44a toward the inner member 24. The rod portion 44b of the exhaust tube support rod 44 is provided in parallel to and below a rod portion 29b of the vehicle body support rod 29 and located rearwardly of the rod portion 29b in a rearward direction of the vehicle body.

The rod portion 29b of the vehicle body support rod 29 and the rod portion 44b of the exhaust tube support rod 44 are connected to each other through a connecting member (elastic member) 51. The connecting member 51 is an elastically deformable rubber member having a generally oval outline. The connecting member 51 has locking holes 52 formed through opposite end portions thereof. The rod portion 29b is locked in one of the locking holes 52 of the connecting member 51 and the rod portion 44b is locked in the other of the locking holes 52 of the connecting member 51, such that the exhaust tube 18 is supported by the vehicle body support rod 29 (i.e., the vehicle body Ve) through the connecting member 51.

As shown in FIGS. 4 and 5, the inner member 24 has a framework sidewall 25 facing in a direction toward the right sidewall 37 of the fuel container 16. The framework sidewall 25 assumes a vertical position in an opposed relationship with the right sidewall 37 (see FIG. 7, too). The framework sidewall 25 has a region 26 overlapping the right sidewall 37 of the fuel container 16 and the chamber 42 in the widthwise direction of the vehicle. The overlap region 26 has a length L1 extending in the front-rear direction of the vehicle body.

The framework sidewall 25 also has a framework sidewall region 27 having a length L2 extending in the front-rear direction and the length L2 is slightly larger than the length of the overlap region 26. The framework sidewall region 27 has a front end 27a slightly spaced from the chamber 42 in the forward direction of the vehicle body, and a rear end 27b slightly spaced from the chamber 42 in the rearward direction of the vehicle body. The slider member 23 is provided on the framework sidewall region 27.

The slider member 23 has a front end 23a slightly spaced from the chamber 42 in the forward direction of the vehicle body, and a rear end 23b slightly spaced from the chamber 42 in the rearward direction of the vehicle body. That is to say, the slider member 23 more extends in the front-rear direction of the vehicle body than the overlap region 26. The front end 23a of the slider member 23 is roughly flush with a front line 56, and the rear end 23b of the slider member 23 is roughly flush with a rear line 57. The front and rear lines 56, 57 extend straight in the widthwise direction of the vehicle.

Figure 6:
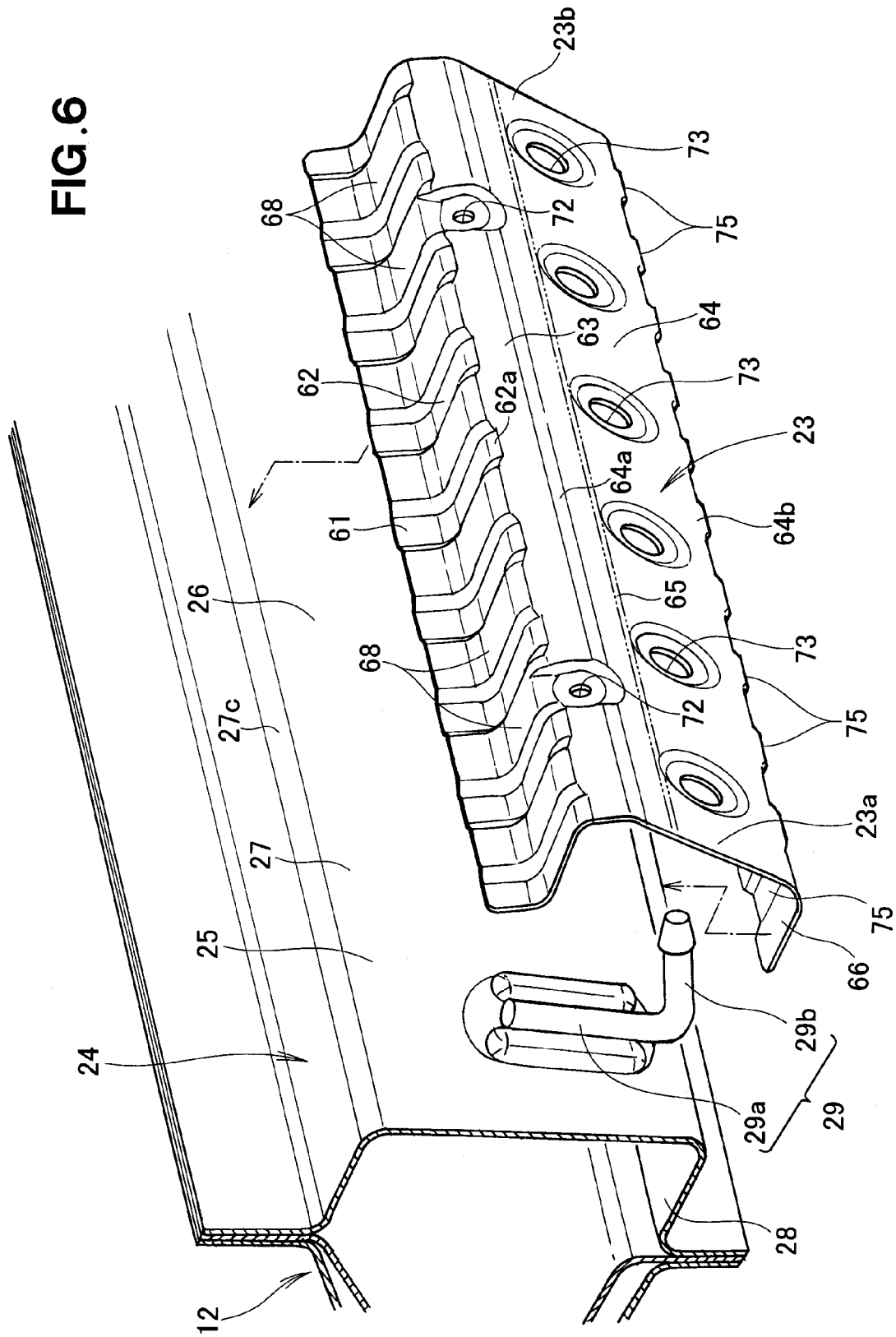
FIG. 6 is an exploded perspective view of the slider member in embodiment 1.
Figure 7:
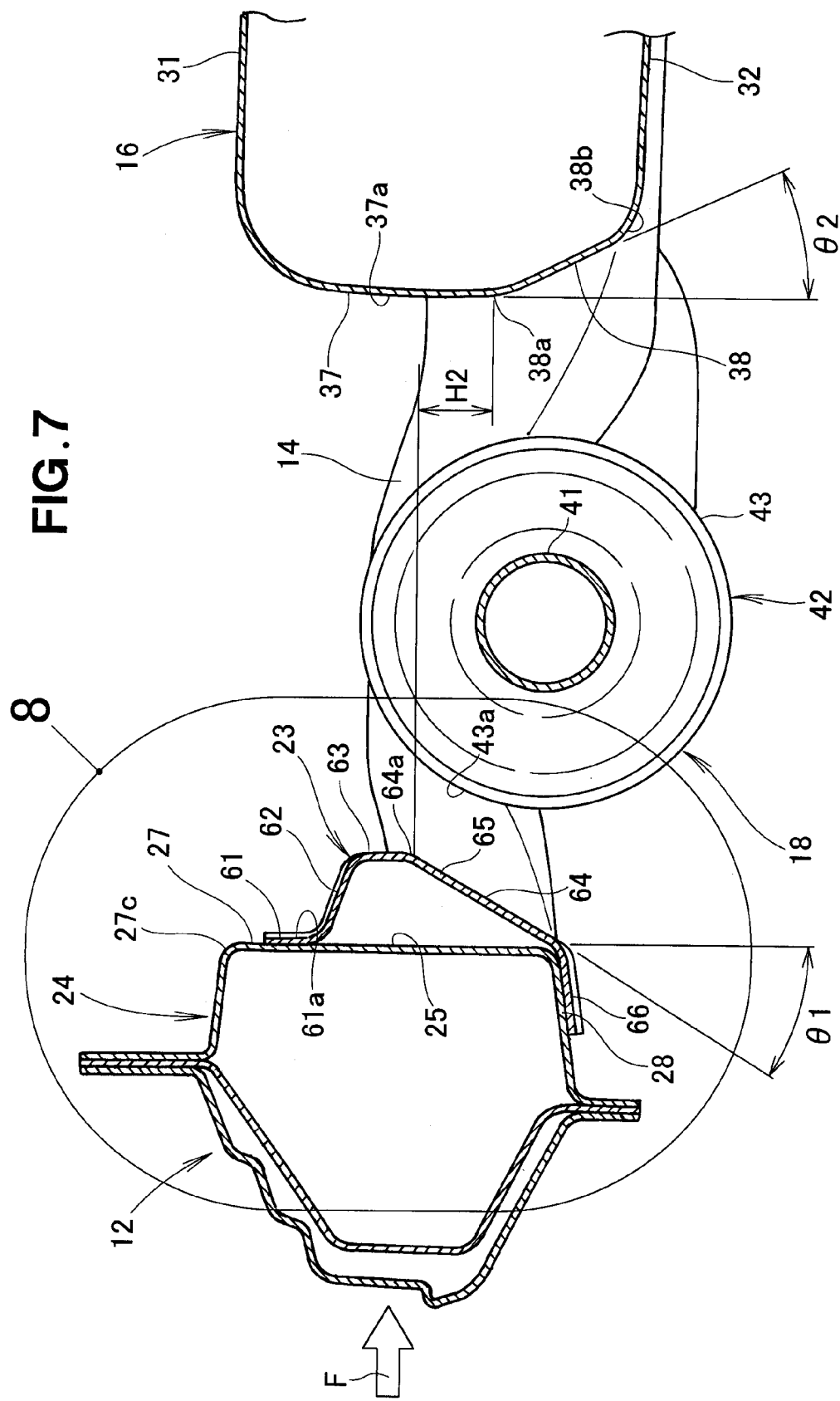
FIG. 7 is a cross-sectional view taken along line 7-7 of FIG. 1.

As shown in FIGS. 6 and 7, the slider member 23 is formed by bending a high tensile strength steel (JSC590, thickness: 1.4 mm) and is defined by an upper mounting portion 61, a projecting portion 62, a wall portion 63, a slider slanting portion 64 and a lower mounting portion 66, all of which are integral with one another. The high tensile strength steel of thickness of 1.4 mm secures a high strength (rigidity) of the slider member 23.

The upper mounting portion 61 of the slider member 23 is provided along an upper side 27c of the framework sidewall region 27 and the lower mounting portion 66 of the slider member 23 is provided along a bottom portion 28 of the inner member 24. The bottom portion 28 of the inner member 24 is folded in a widthwise outward direction of the vehicle in a generally orthogonal relationship with the framework sidewall region 27. With the upper and lower mounting portions 61, 66 provided on the inner member 24, the projecting portion 62, the wall portion 63 and the slider slanting portion 64 cooperate to define a generally V-shaped outline protruding away from the framework sidewall region 27 in a widthwise inward direction of the vehicle.

The upper mounting portion 61 is welded along the upper side 27c of the framework sidewall region 27. The projecting portion 62 protrudes generally horizontally (more specifically slightly obliquely downwardly) from a lower side 61a of the upper mounting portion 61 in the widthwise inward direction of the vehicle. A plurality of upper ribs 68 are formed on the upper mounting portion 61 and the projecting portion 62. The plurality of upper ribs 68 are spaced at predetermined intervals from one another in the front-rear direction of the vehicle body. The upper ribs 68 protrude from the upper mounting portion 61 and the projecting portion 62 outwardly of the slider member 23 and extend vertically and then in the widthwise direction of the vehicle along front and rear ends 23a, 23b of the slider member 23.

Figure 8:
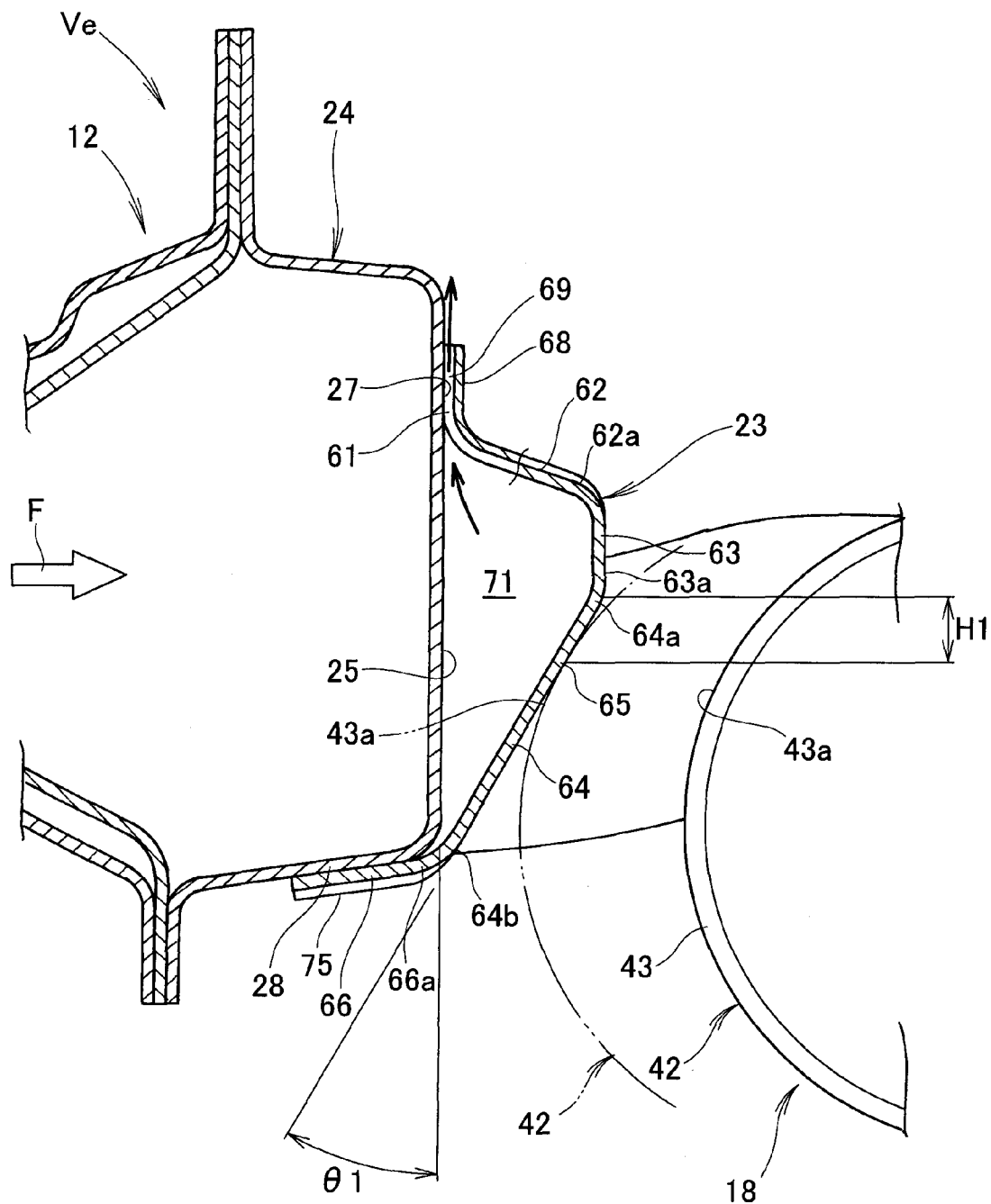
FIG. 8 is an enlarged view of region 8 shown in FIG. 7.

As shown in FIG. 8, the plurality of upper ribs 68, which are formed on the upper mounting portion 61, define a gap 69 between themselves and the framework sidewall region 27. This allows an air remaining in a space 71 between the inner member 24 and the slider member 23 to be discharged out through the gap 69 in applying an anti-corrosion coating to the vehicle body such as the inner member 24 and the slider member 23. That is, the anti-corrosion coating can be well applied to the inner member 24 and the slider member 23.

As shown in FIGS. 6 and 8, the wall portion 63 depends downwardly from an inner end 62a of the projecting portion 62, and has a pair of positioning holes 72 formed therethrough. A positioning jig can be locked in the pair of positioning holes 72 to position the wall portion 63 accurately on the framework sidewall region 27.

The slider slanting portion 64, which extends from a lower end 63a of the wall portion 63 to an inner end 66a of the lower mounting portion 66, inclines in the widthwise outward direction of the vehicle. The lower end 63a of the wall portion 63 is continuous with an upper end 64a of the slider slanting portion 64, and the inner end 66a of the lower mounting portion 66 is continuous with a lower end 64b of the slider slanting portion 64.

The slider slanting portion 64 inclines in the widthwise inward direction of the vehicle such that the slider slanting portion 64 approaches the right side wall 37 of the fuel container 16 (FIG. 7) as the slider slanting portion 64 extends from the lower end 64b to the upper end 64a. The slider slanting portion 64 inclines at an angle θ1 relative to the framework sidewall region 27. The angle θ1 is, e.g., about 30 degrees. The angle θ1 of the slider slanting portion 64 is set to displace the chamber 42 downwardly, taking account of durability of the connecting member 51 (FIG. 3) and/or impact load F which can be applied from a lateral outer side of the vehicle in a direction of an arrow.

While providing a surficial stiffness of the slider member 23, the slider slanting portion 64 has a plurality of openings 73 formed at predetermined intervals in the front-rear direction of the vehicle body. The slider member 23 has a reduced weight due to the plurality of openings 73 formed in the slider slanting portion 64.

The slider slanting portion 64 has a contact region 65. The contact region 65 is located a height H1 lower than the upper end 64a of the slider slanting portion 64. The slider slanting portion 64 is in face-to-face relationship with an upper half 43a of the chamber 42 (the outer tubular portion 43). The outer tubular portion 43 of the chamber 42 has a circular cross-sectional shape. This allows the contact region 65 to come into abutment on the outer tubular portion 43 (shown by a phantom line) of the chamber 42 when the right framework member 12 is deformed under the impact load F applied from the lateral outer side of the vehicle in the direction of the arrow.

The height H1 by which the contact region 65 is lower than the upper end 64a of the slider slanting portion 64 is set to, preferably, 5 to 10 mm taking account of assemblage tolerance of the chamber 42. That is, the chamber 42 is connected to the vehicle body Ve side through the elastically deformable rubber connecting member 51 (see FIG. 3). For this reason, it is difficult to improve assemblage accuracy of the chamber 42. With this in mind, the height H1 of 5 to 10 mm is set to ensure that the contact region 65 abuts on the outer tubular portion 43 of the chamber 42 with the assemblage tolerance of the chamber 42 taken into consideration.

The reason why the contact region 65 is provided below the upper end 64a of the slider slanting portion 64 is discussed below. In embodiment 1, the outer tubular portion 43 of the chamber 42 has the circular cross-sectional shape. This enables the abutment of the slider slanting portion 64 on the chamber 42 (the outer tubular portion 43). The cross-sectional shape of the chamber can take on a variety of shapes other than the circular shape. However, some cross-sectional shape of the chamber may not allow abutment of the slider slanting portion 64 on the chamber.

To avoid such a problem with the cross-sectional shape of the chamber, the contact region 65 to abut on the chamber 42 (the outer tubular portion 43) is provided below the upper end 64a of the slider slanting portion 64. This enables the abutment of the contact region 65 of the slider slanting portion 64 on the chamber 42, such that the chamber 42 is displaced (moved) downwardly by the slider slanting portion 64, regardless of a cross-sectional shape of the outer tubular portion 43 (without being affecting by the cross-sectional shape of the outer tubular portion 43).

The slider member 23 is formed from a high tensile strength steel (JSC590, thickness: 1.4 mm) to secure a strength of the slider member 23 so as to prevent deformation of the slider member 23 when the contact region 64 of the slider slanting portion 64 abuts on the chamber 42. The slider slanting portion 64 inclines in the widthwise inward direction of the vehicle such that as the slider slanting portion 64 extends from the lower end 64b to the upper end 64a, the slider slanting portion 64 approaches the right sidewall 37 of the fuel container 16. When the right framework member 12 is deformed toward the right sidewall 37 of the fuel container 16 under the impact load F, thus, the contact region 65 of the slider slanting portion 64 abuts on the chamber 42 (the outer tubular portion 43) to displace the chamber 42 downwardly (obliquely downwardly).

The exhaust tube 18 is supported by the vehicle body support rod 29 (i.e., the vehicle body Ve) through the connecting member 51 (FIG. 3). The connecting member 51 is the elastically deformable rubber member. Deformation (stretching) or breakage of the connecting member 51 allows the chamber 42 to be smoothly displaced downwardly.

The lower mounting portion 66 is welded along the bottom portion 28 of the inner member 24. A plurality of lower ribs 75 (see FIG. 5, too) is formed on the lower mounting portion 66 at predetermined intervals in the front-rear direction of the vehicle body. The lower ribs 75 protrude from the lower mounting portion 66 outwardly of (i.e., downwardly from) the slider member 23, while extending in parallel to the front and rear ends 23a, 23b of the slider member 23.

The plurality of upper ribs 68 formed on the upper mounting portion 61 and the projecting portion 62 and the plurality of lower ribs 75 formed on the lower mounting portion 66 further secures the strength of the slider member 23. With this arrangement, the chamber 42 can be better displaced downwardly by the abutment of the contact region 65 of the slider slanting portion 64 on the chamber 42 (the outer tubular portion 43).

As shown in FIG. 7, the container slanting portion 38 defines a generally lower half of the right sidewall 37. The container slanting portion 38, which extends from an upper end 38a of the container slanting portion 38 to a lower end 38b of the containing slanting portion 38, inclines in the widthwise inward direction of the vehicle. Stated otherwise, the container slanting portion 38 inclines in the widthwise inward direction of the vehicle such that the container slanting portion 38 approaches the framework sidewall region 27 as the container slanting portion 38 extends from the lower end 38*b* to the upper end 38*a*.

The container slanting portion 38 inclines at an angle θ 2 relative to a generally upper half 37*a* of the right sidewall 37. The angle θ 2 is, e.g., about 30 degrees, as is the angle θ 1. As is the case with the angle θ 1 of the inclination of the slider slanting portion 64, the angle θ 2 of the container slanting portion 38 is set to displace the chamber 42 downwardly, taking account of durability of the connecting member 51 (FIG. 3) and/or the impact load F.

Since the container slanting portion 38 inclines to approach the framework sidewall region 27 as the container slanting portion 38 extends from the lower end 38*b* to the upper end 38*a*, the chamber 42 abuts on the container slanting portion 38 after the slider slanting portion 64 abuts on the chamber 42. When the chamber 42 abuts on the container slanting portion 38, both the slider slanting portion 64 and the container slanting portion 38 promote the downward displacement of the chamber 42.

The upper end 38*a* of the container slanting portion 38 is located a height H2 lower than the upper end 64*a* of the slider slanting portion 64. The reason why the upper end 38*a* of the container slanting portion 38 is provided below the upper end 64*a* of the slider slanting portion 64 is discussed below. That is, the abutment of the slider slanting portion 64 on the chamber 42 displaces the chamber 42 downwardly. After the chamber 42 is displaced downwardly by the slider slanting portion 64, a very short time passes before the chamber 42 abuts on the container slanting portion 38.

With this in mind, the upper end 38*a* of the container slanting portion 38 is located the height H2 lower than the upper end 64*a* of the slider slanting portion 64. That is, the container slanting portion 38 is provided in correspondence to the chamber 42 displaced downwardly by the slider slanting portion 64. This makes it possible to reliably bring the chamber 42, displaced downwardly by the slider slanting portion 64, into abutment on the container slanting portion 38 so as to better promote the downward displacement of the chamber 42.

The downward displacement of the chamber 42 allows removal of the chamber 42 from between the right framework member 12 and the fuel container 16. As a result, an amount of crushing due to the impact load F is secured between the right framework member 12 and the fuel container 16. Thus, it is possible to well absorb the impact load F (impact load from the vehicle lateral side) produced by the lateral collision.

Since the amount of crushing due to the impact load F is secured by the downward displacement of the chamber 42, there is no likelihood that the amount of crushing due to the impact load F is limited by the chamber 42. In other words, securing a large amount of crushing between the right framework member 12 and the fuel container 16 does not require taking account of the chamber 42 limiting the amount of crushing. Thus, the fuel container 16 can be wide toward the chamber 42 to provide a large capacity of the fuel container 16.

An example of application of the impact load F from the lateral side of the vehicle body structure 10 is discussed with reference to FIGS. 9 and 10.

As shown in (a) of FIG. 9, the impact load F is applied from the lateral outer side of the vehicle to the right framework member 12. Under the applied impact load F, the right framework member 12 is deformed in the widthwise inward direction of the vehicle, as indicated by an arrow A.

As shown in (b) of FIG. 9, the deformation of the right framework member 12 causes the slider member 23 to move together with the right framework member 12 in the widthwise inward direction of the vehicle, as indicated by the arrow A. The movement of the slider member 23 causes the contact region 65 of the slider slanting portion 64 to abut on the upper half 43*a* of the chamber 42 (the outer tubular portion 43). With the contact region 65 abutting on the upper half 43*a* of the outer tubular portion 43, the slider member 23 keeps moving in the direction of the arrow A. After abutting on the chamber 42, the slider slanting portion 64 displaces the chamber 42 downwardly, as indicated by an arrow B.

As shown in (a) of FIG. 10, the upper end 38*a* of the container slanting portion 38 is located the height H2 lower than the upper end 64*a* of the slider slanting portion 64. Thus, when the chamber 42 is displaced obliquely downwardly by the slider slanting portion 64, as indicated by an arrow B ((b) of FIG. 9), the chamber 42 abuts on the container slanting portion 38. The abutment of the chamber 42 on the container slanting portion 38 causes both the slider slanting portion 64 and the container slanting portion 38 to promote downward displacement of the chamber, as indicated by an arrow C.

Turning back to FIG. 3, the exhaust tube 18 (the chamber 42) is supported by the vehicle body support rod 29 (vehicle body Ve) through the elastically deformable rubber connecting member 51. Deformation (stretching) or breakage of the connecting member 51 allows the chamber 42 to be smoothly displaced downwardly, as indicated by the arrow C.

As shown in (c) of FIG. 10, the downward displacement of the chamber 42 allows removal of the chamber 42 from between the right framework member 12 and the fuel container 16. This enables the right framework member 12 to keep moving in the direction of the arrow A. As a result, a sufficient amount of crushing due to the impact load F is secured between the right framework member 12 and the fuel container 16 so as to well absorb the impact load F produced by the lateral collision.

Embodiments 2 and 3 are discussed below with reference to FIGS. 11 and 12. The same parts in embodiments 2 and 3 as those in embodiment 1 or the corresponding parts are denoted by the same reference signs and the description of these parts are omitted.

Embodiment 2

Figure 11:
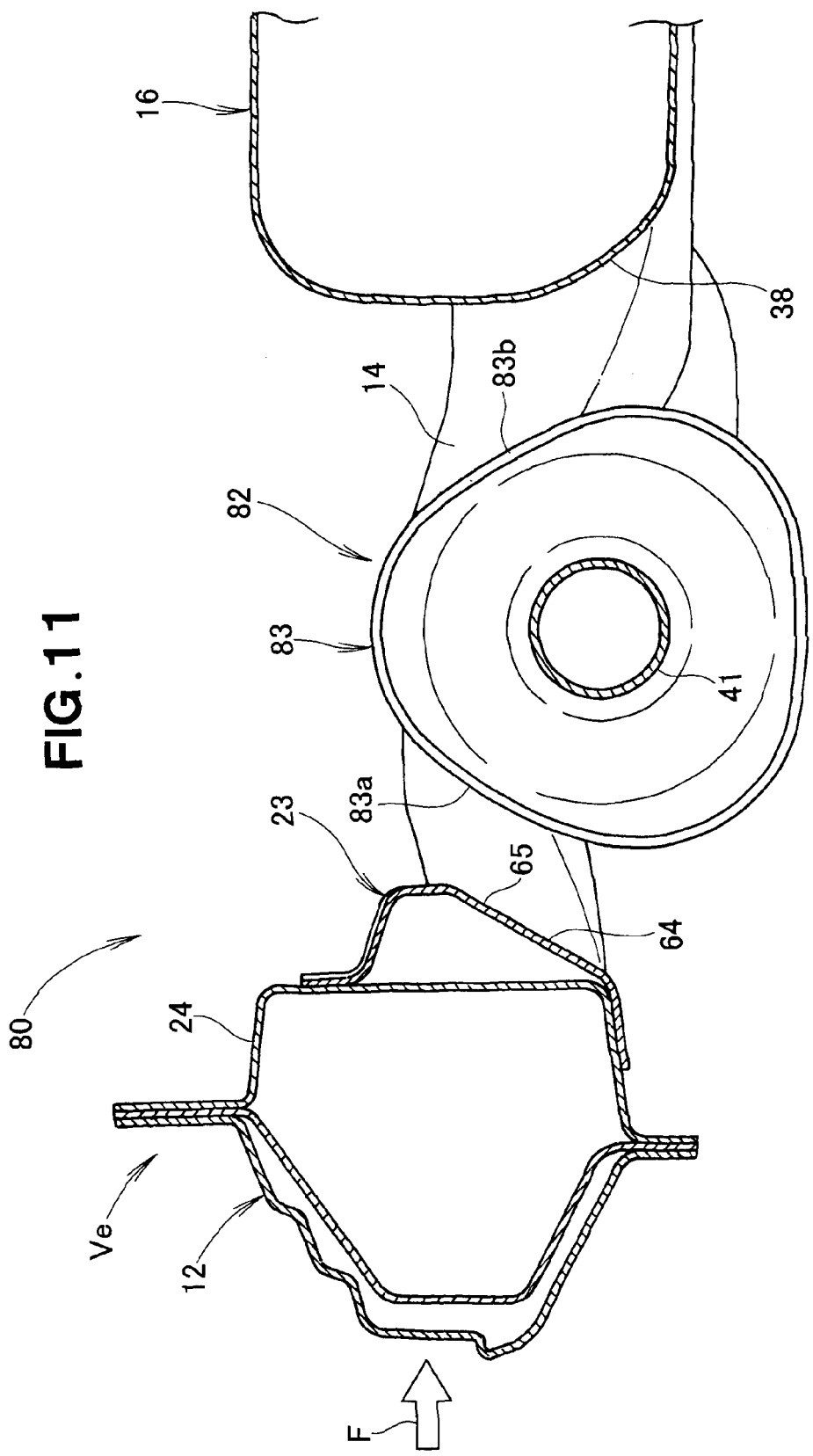
FIG. 11 is a cross-sectional view of a vehicle body structure in embodiment 2 of the present invention.

A vehicle body structure 80 in embodiment 2 shown in FIG. 11 is the same as the vehicle body structure 10 except that the vehicle body structure 80 includes a chamber 82 in place of the chamber 42 discussed in embodiment 1.

The chamber 82 includes an outer tubular portion 83 of generally triangular cross-section. The outer tubular portion 83 is, for example, one size larger than the outer tubular portion 43 of circular cross-sectional shape in embodiment 1. The chamber 82 is supported by the vehicle body support rod 29 (i.e., the vehicle body Ve) through the connecting member 51 (FIG. 3), as in embodiment 1.

In this state, the chamber 82 is disposed in such a manner that the contact region 65 of the slider slanting portion 64 can abut on a slanting portion 83*a* of the outer tubular portion 83, which slanting portion 83*a* is located facing in the widthwise outward direction of the vehicle. Additionally, the chamber 82 is disposed in such a manner that the a slanting portion 83*b* of the outer tubular portion 83 can abut on the container slanting portion 38, which slanting portion 83*b* is located facing in the widthwise inward direction of the vehicle.

When the impact load F is applied from the lateral outer side of the vehicle to the right framework member 12, thus, the slider slanting portion 64 and the container slanting portion 38 displace (move) the chamber 82 downwardly, as is discussed in embodiment 1. As a result, the impact load F produced by the lateral collision is well absorbed, as in embodiment 1. As in embodiment 1, further, the fuel container 16 can be wide toward the chamber 82 to provide a large capacity of the fuel container 16.

Embodiment 3

Figure 12:
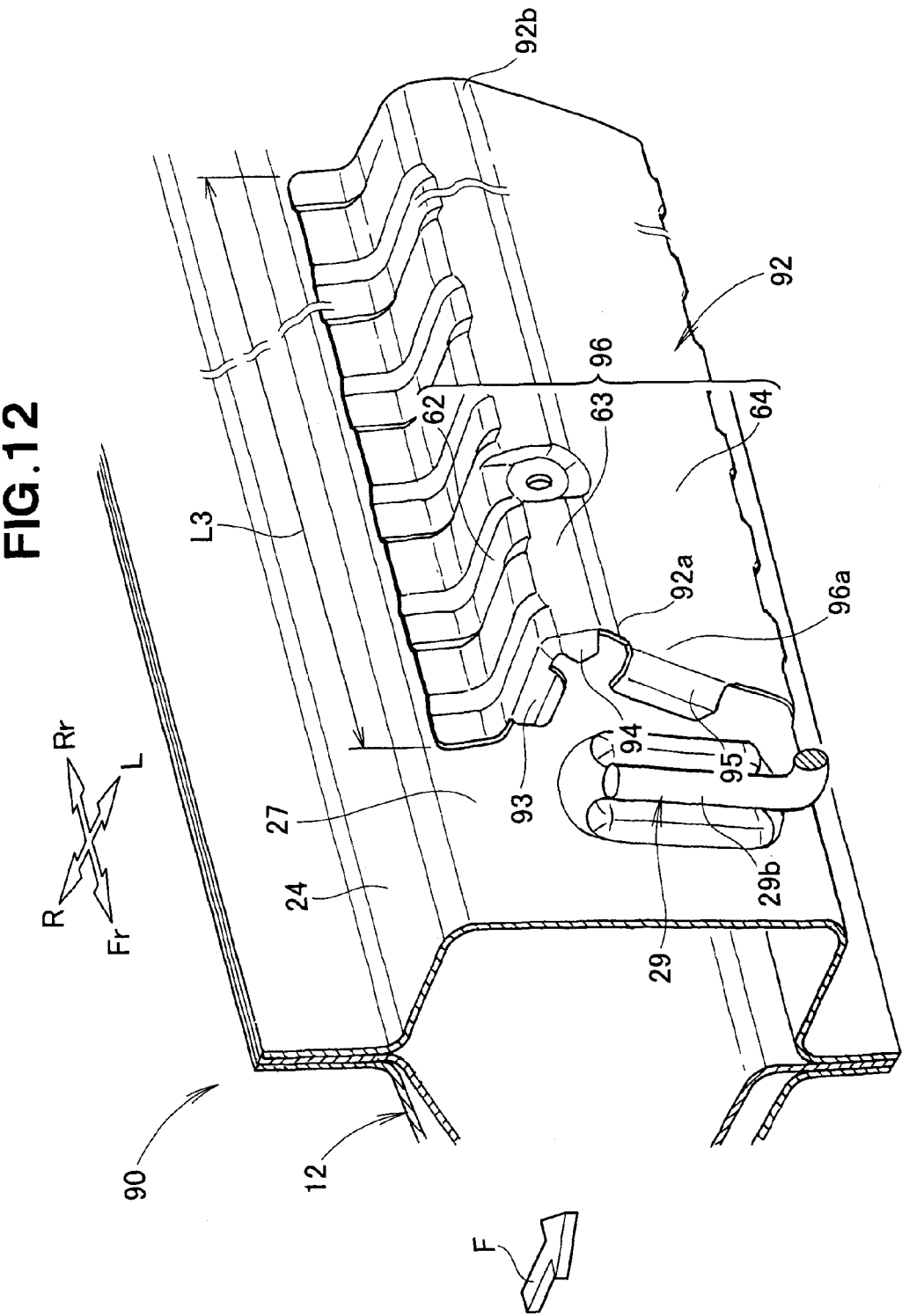
FIG. 12 is a cross-sectional view of a vehicle body structure in embodiment 3 of the present invention.

A vehicle body structure 90 in embodiment 3 shown in FIG. 12 is the same as the vehicle body structure 10 except that the vehicle body structure 90 includes a slider member 92 in place of the slider member 23 discussed in embodiment 1.

The slider member 92 has a length L3 extending in the front-rear direction of the vehicle body and the length L3 is smaller than that of the slider member 23 (FIG. 4). The slider slanting portion 64 of the slider member 92 does not have a plurality of openings 73 (FIG. 6). The slider member 92 has an overhang 96 defined by the projecting portion 62, wall portion 63 and slider slanting portion 64, and the overhang 96 protrudes from the framework sidewall region 27 in the widthwise inward direction of the vehicle. The overhang 96 has bent pieces 93, 94, 95 provided at a front end portion 96a thereof.

The reason why the length L3 of the slider member 92 is small and the slider slanting portion 64 lacks the plurality of openings 73 is discussed below. That is, to correspond to the vehicle body Ve, it is thought that the chamber 42 in embodiment 1 or the chamber 82 in embodiment 2 can have a small length extending in the front-rear direction of the vehicle. In this case, the length L3 of the slider member 92 is set to be small to conform to the lengths of the chambers 42, 82.

Since the length L3 of the slider member 92 is small, the slider member 92 is low in weight. It is thus unnecessary to form the plurality of openings 73 on the slider slanting portion 64 in order to make the weight of the slider member 92 low. Since the plurality of openings 73 need not be formed on the slider slanting portion 64, it is possible to more easily secure the strength (rigidity) of the slider member 92.

The reason why the bent pieces 93, 94, 95 are provided at the front end portion 96a of the overhang 96 is discussed below. That is, the impact load F applied from the lateral outer side of the vehicle to the right framework member 12 can be, for example, an impact load F applied to a front side of the slider member 92, which front side faces in the forward direction of the vehicle body. In this case, a front end 92a of the slider member 92 (i.e., the front end portion 96a of the overhang 96) may be forced to stick out in the widthwise inward direction of the vehicle.

With this in mind, the bent pieces 93, 94, 95 are provided at the front end 92a of the slider member 92, i.e., the front end portion 96a of the overhang 96. The bent pieces 93, 94, 95 define a round shape of the front end 96a of the overhang 96. The round shape of the front end 96a better prevents the front end 96a form doing damage to components of the vehicle body structure 90 upon abutment of the front end 96a on the components of the vehicle body structure 90.

The vehicle body structure of the present invention is not limited to the foregoing embodiments, but the appropriate modifications or improvements may be made. For example, the energy container, which is discussed as the fuel container (fuel tank) 16 for holding a liquid fuel in embodiment 1 to 3, may be a gas container for holding a gaseous material (gas, hydrogen) or a container for housing a cell etc.

Although the slider slanting portion 64 is provided on the slider member 23 and the container slanting portion 38 is provided on the right sidewall 37 of the fuel container 16 in embodiments 1 to 3, the present invention is not limited to this arrangement. The chamber 42 can be displaced downwardly just by providing the slider slanting portion 64 on the slider member 23.

Although the vehicle body support rod 29 is provided on the right framework member 12 forming the vehicle body Ve in embodiments 1 to 3, the present invention is not limited to this arrangement. The vehicle body support rod 29 may be provided on other members such as mounting brackets or the floor panel 21 forming the vehicle body Ve.

Although the slider member 23 is formed from the high tensile strength steel (JSC590, thickness: 1.4 mm) in embodiments 1 to 3, the present invention is not limited to this arrangement. The slider member 23 may be formed from other materials.

Although the slider member 23 has the plurality of upper ribs 68 formed on the upper mounting portion 61 and the projecting portion 62 and the plurality of lower ribs 75 formed on the lower mounting portion 66 in embodiments 1 to 3, the present invention is not limited to this arrangement. For example, additional plural ribs interconnecting the upper ribs 68 and the lower ribs 75 may be provided all over the slider member 23. These additional ribs provided all over the slider member 23 enables further improvement of the strength.

The vehicle body structure, the left and right framework members, the fuel container, the exhaust tube, the slider member, the container slanting portion, the exhaust pipe, the chamber, the connecting member and the slider slanting portion are not limited to those discussed in embodiments 1 to 3, but may be appropriately modified.

INDUSTRIAL APPLICABILITY

The present invention is suitable for use in an automobile including a vehicle body structure having an energy container provided between left and right framework members, and an exhaust tube provided between the energy container and the framework member.

REFERENCE SIGNS LIST 10, 80, 90 . . . vehicle body structures, 12 . . . left and right framework members, 16 . . . a fuel container (energy container), 18 . . . an exhaust tube, 23, 92 . . . slider members, 25 . . . a framework sidewall, 27 . . . an overlap region, 37 . . . a right sidewall, 38 . . . a container slanting portion, 38a . . . a lower end of the container slanting portion, 38b . . . an upper end of the container slanting portion, 41 . . . an exhaust pipe, 42, 82 . . . chambers, 51 . . . a connecting member (an elastic member) 64 . . . a slider slanting portion, 64a . . . an upper end of the slider slanting portion, 64b . . . a lower end of the slider slanting portion, 65 . . . a contact region, D . . . an outer diameter, F . . . an impact load, Ve . . . a vehicle body

The invention claimed is:

1. A vehicle body structure comprising:
left and right framework members extending in a front-rear direction of a vehicle body on left and right sides of the vehicle body;
an energy container provided between the left and right framework members; and an exhaust tube provided between the energy container and one of the left and right framework members and extending in the front-rear direction of the vehicle body, wherein the exhaust tube includes an exhaust pipe and a chamber larger in outer diameter than the exhaust pipe, wherein said one of the left and right framework members includes a framework sidewall provided on a side adjacent to the energy container, the framework sidewall having an overlap region overlapping the energy container and the chamber in a widthwise direction of a vehicle, said one of the left and right framework members having a slider member attached the overlap region of the framework sidewall, and wherein the slider member has a slider slanting portion having an upper end and a lower end, the slider slanting portion inclining in a widthwise inward direction of the vehicle such that the slider slanting portion approaches the energy container as the slider slanting portion extends from the lower end to the upper end.

2. The vehicle body structure of claim 1, wherein the slider slanting portion has a contact region to abut on the chamber when an impact load is applied from a lateral side of the vehicle, and the contact region is located below the upper end of the slider slanting portion and adapted to press the chamber in an obliquely downward direction to a lowered position at which the chamber is not disposed between said one of the left and right framework members and the container.

3. The vehicle body structure of claim 1, wherein the energy container has a container sidewall provided on a side adjacent to said one of the left and right framework members, the container sidewall having a container slanting portion having an upper end and a lower end, the container slanting portion inclining in a widthwise outward direction of the vehicle such that the container slanting portion approaches said one of the left and right framework members as the container slanting portion extends from the lower end to the upper end.

4. The vehicle body structure of claim 1, wherein the energy container has a container sidewall provided on a side adjacent to said one of the left and right framework members, the container sidewall having a container slanting portion having an upper end and a lower end, the container slanting portion inclining in a widthwise outward direction of the vehicle such that the container slanting portion approaches said one of the left and right framework members as the container slanting portion extends from the lower end to the upper end, and wherein the upper end of the container slanting portion is located below the upper end of the slider slanting portion.

5. The vehicle body structure of claim 1, wherein the exhaust tube is supported by the vehicle body through an elastic member.

6. The vehicle body surface of claim 2, wherein the energy container has a container sidewall provided on a side adjacent to said one of the left and right framework members, the container sidewall having a container slanting portion having an upper end and a lower end, the container slanting portion inclining in a widthwise outward direction of the vehicle such that the container slanting portion approaches said one of the left and right framework members as the container slanting portion extends from the lower end to the upper end, wherein the upper end of the container slanting portion is located below the upper end of the slider slanting portion, and wherein when the impact load is applied from the lateral side of the vehicle, the container slanting portion is adapted to abut on the chamber and guide the chamber in the obliquely downward direction as the chamber is pressed by the slider slanting portion in the obliquely downward direction, so that the chamber is moved to the lowered position at which the chamber is not disposed between said one of the left and right framework members and the container.

7. The vehicle body structure of claim 6, wherein the exhaust tube is supported by the vehicle body through an elastic member, and the elastic member is deformable to allow the chamber to be moved to the lowered position when the slating portion abuts on the chamber.

* * * * *